United States Patent
Grebe et al.

(10) Patent No.: US 9,238,310 B2
(45) Date of Patent: Jan. 19, 2016

(54) COMPONENT PROPERTIES THROUGH BEAM SHAPING IN THE LASER SINTERING PROCESS

(75) Inventors: Maik Grebe, Bochum (DE); Sylvia Monsheimer, Haltern am See (DE); Wolfgang Diekmann, Waltrop (DE); Juergen Kreutz, Marl (DE)

(73) Assignee: Evonik Degussa GmbH, Essen (DE)

(*) Notice: Subject to any disclaimer, the term of this patent is extended or adjusted under 35 U.S.C. 154(b) by 495 days.

(21) Appl. No.: 13/552,842

(22) Filed: Jul. 19, 2012

(65) Prior Publication Data

US 2013/0183493 A1  Jul. 18, 2013

(30) Foreign Application Priority Data

Jul. 21, 2011 (DE) .......... 10 2011 079 521

(51) Int. Cl.
| | | |
|---|---|---|
| *B29C 41/02* | (2006.01) | |
| *B29C 35/08* | (2006.01) | |
| *B29C 67/00* | (2006.01) | |
| *B32B 27/16* | (2006.01) | |

(52) U.S. Cl.
CPC ............. *B29C 35/08* (2013.01); *B29C 67/0077* (2013.01); *B32B 27/16* (2013.01); *Y10T 428/24479* (2015.01)

(58) Field of Classification Search
CPC .................................................. B29C 67/0077
USPC .................................................. 264/85, 497
See application file for complete search history.

(56) References Cited

U.S. PATENT DOCUMENTS

| 5,182,170 | A | * | 1/1993 | Marcus et al. ................. 264/497 |
| 5,846,370 | A | * | 12/1998 | O'Connor .................. 264/497 X |
| 6,136,948 | A | | 10/2000 | Dickens, Jr. et al. |
| 6,245,281 | B1 | | 6/2001 | Scholten et al. |
| 6,554,600 | B1 | | 4/2003 | Hofmann et al. |
| 2001/0002287 | A1 | * | 5/2001 | Kar et al. ........................ 427/554 |
| 2004/0239009 | A1 | * | 12/2004 | Collins et al. .................. 264/497 |
| 2007/0183918 | A1 | | 8/2007 | Monsheimer et al. |
| 2007/0238056 | A1 | | 10/2007 | Baumann et al. |
| 2011/0052927 | A1 | * | 3/2011 | Martinoni et al. .......... 428/474.7 |
| 2011/0129682 | A1 | * | 6/2011 | Kurata et al. .................. 428/500 |
| 2011/0252618 | A1 | | 10/2011 | Diekmann et al. |

(Continued)

FOREIGN PATENT DOCUMENTS

| DE | 197 47 309 A1 | 4/1999 |
| EP | 1 037 739 B1 | 9/2000 |
| EP | 2 335 848 A1 | 6/2011 |

(Continued)

OTHER PUBLICATIONS

European Search Report issued Dec. 3, 2012, in European Patent Application No. 12173406.5 with English translation of category of cited documents.

(Continued)

*Primary Examiner* — Leo B Tentoni
(74) *Attorney, Agent, or Firm* — Oblon, McClelland, Maier & Neustadt, L.L.P.

(57) ABSTRACT

An apparatus and method for the layer-by-layer production of three-dimensional objects wherein a powder layer is melted with a laser beam shaped such that the focus maximum power density is less than 50% greater than the average power density, is provided. Also provided are the corresponding mouldings.

13 Claims, 1 Drawing Sheet

(56) References Cited

U.S. PATENT DOCUMENTS

2011/0278773 A1* 11/2011 Bokodi et al. ............... 264/497
2013/0064706 A1    3/2013  Schwarze et al.

FOREIGN PATENT DOCUMENTS

WO   WO 96/06881          3/1996
WO   WO-2009020130 A1 *   2/2009

OTHER PUBLICATIONS

Darrell Bunyan, et al., "Application of Holographic Beam Shaping in Selective Laser Melting for the Fabrication of Functional Polymer Components", $28^{th}$ International Congress: Applications of Lasers & Electro-Optics (ICALEO), Nr. paper 1907, XP-008157621, Nov. 1, 2009, pp. 840-848.

Dr. Alexander Laskin, "Beam Shaping Optics for Additive Laser Technologies", XP002685987, URL:http://www.lia.org/blog/2011/02/beam-shaping-optics-for-additive-laser-technologies/, Feb. 16, 2011, 2 pages.

* cited by examiner

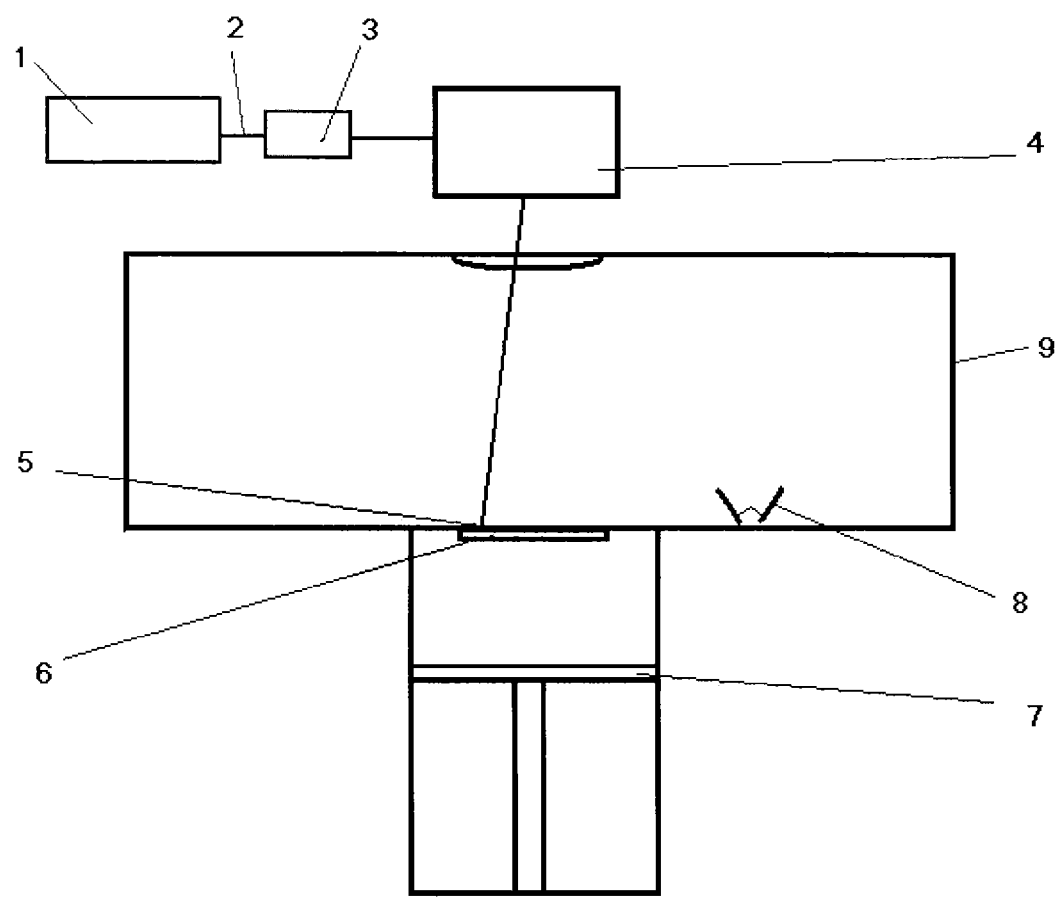

COMPONENT PROPERTIES THROUGH BEAM SHAPING IN THE LASER SINTERING PROCESS

CROSS REFERENCE TO RELATED APPLICATIONS

This application claims priority to German Application No. 102011079521.9, filed Jul. 21, 2011, the disclosure of which is incorporated herein by reference in its entirety.

BACKGROUND OF THE INVENTION

FIELD OF THE INVENTION

The present invention relates to an apparatus for the layer-by-layer production of three-dimensional objects, to processes for layer-by-layer production, and also to corresponding mouldings.

A task frequently encountered in very recent times is the rapid production of prototypes. Processes which permit this are termed rapid prototyping/rapid manufacturing, or else additive fabrication processes. Processes that are particularly suitable are those which are based on pulverulent materials and in which the desired structures are produced layer-by-layer through selective melting and solidification. Supported structures for overhangs and undercuts can be omitted in such methods because the powder bed surrounding the molten regions provides sufficient supportive effect. The downstream operation of removing supports is also omitted. The processes are also suitable for small-run production. The construction-chamber temperature is selected in such a way that the structures produced layer-by-layer do not warp during the construction process.

A process which has particularly good suitability for the purpose of rapid prototyping/rapid manufacturing is selective laser sintering (SLS). The laser sintering (rapid prototyping) process for producing mouldings from pulverulent polymers is described in detail in U.S. Pat. No. 6,136,948 and WO 96/06881 (both DTM Corporation). A wide variety of polymers and copolymers is claimed for the application, examples being polyacetate, polyester, polyvinyl chloride, polypropylene, polyethylene, ionomers and polyamide.

A problem with the process as described above is that the polymeric material is damaged by local temperature peaks at the focus of the laser. The local temperature peaks can cause breakage within the molecular chains of the polymer. Furthermore, temperature peaks at the laser focus occasionally cause release of constituents of the polymeric materials during processing. The substances released disrupt the process because they deposit on important components, such as lenses or pyrometers, and impair the functioning of these. A simple reduction of the energy of the laser is not useful in achieving the objective because the amount of energy introduced is then insufficient to melt the pulverulent material at an adequate rate and such measure would markedly slow the process.

It is therefore an object of the present invention to improve the laser sintering process.

SUMMARY OF THE INVENTION

This and other objects have been achieved by the present invention, the first embodiment of which includes a method for layer-by-layer production of a three dimensional object, comprising:

applying a layer of a polymer powder having a thickness;

selectively irradiating portions of the polymer powder layer with a laser beam having an average power density and a focus maximum power density to melt and sinter the irradiated polymer powder;

cooling the melted and sintered powder to obtain a solid mass having a shape; and repeating the application, irradiating and cooling operations until the three dimensional object is obtained;

wherein before irradiation of the polymer powder, the laser beam is shaped such that the focus maximum power density is less than 50% greater than the average power density.

In a preferred embodiment the method of the present invention includes at least one of refractively shaping the laser beam and homogenizing the laser beam prior to irradiation of the polymer powder.

In a highly preferred embodiment of the layer-by-layer production method according to the invention, the polymer powder is nylon-12 and in a further highly preferred embodiment, a radiation absorber is added to the nylon-12.

In an especially preferred embodiment of the method of the present invention a difference between a solution viscosity of the melted and sintered polymer and a solution viscosity of the polymer powder is less than 10%, the solution viscosity measured according to ISO 307.

The present invention further provides an apparatus for the layer-by-layer production of a three dimensional object according to the above embodiments and according to this embodiment, the apparatus comprises at least the following components:

a construction chamber;

a vertically moveable construction platform in a lower surface of the construction chamber;

a powder applicator;

a laser;

a laser beam shaping apparatus; and a laser beam scanner;

wherein the components are arranged such that the laser beam is directed to the surface of the construction platform, and at the construction platform the focus maximum power density of the laser beam is less than 50% greater than the average power density of the laser beam.

In a highly preferred embodiment, the laser beam shaping apparatus comprises at least one of a refractive beam shaper and a beam homogenizer.

BRIEF DESCRIPTION OF THE DRAWING

FIG. 1 shows a schematic drawing of an apparatus according to one embodiment of the invention.

DETAILED DESCRIPTION OF THE INVENTION

Surprisingly, the present inventors have found that the problem described above for conventionally known layer-by-layer systems can be solved by using a suitable power density distribution or energy density distribution at the laser focus.

Thus, the first embodiment of the present invention provides a method for layer-by-layer production of a three dimensional object, comprising:

applying a layer of a polymer powder having a thickness;

selectively irradiating portions of the polymer powder layer with a laser beam having an average power density and a focus maximum power density to melt and sinter the irradiated polymer powder;

cooling the melted and sintered powder to obtain a solid mass having a shape; and repeating the application, irradiating and cooling operations until the three dimensional object is obtained;

wherein before irradiation of the polymer powder, the laser beam is shaped such that the focus maximum power density is less than 50% greater than the average power density.

In a preferred embodiment the method of the present invention includes at least one of refractively shaping the laser beam and homogenizing the laser beam prior to irradiation of the polymer powder.

In a highly preferred embodiment of the layer-by-layer production method according to the invention, the polymer powder is nylon-12 and in a further highly preferred embodiment, a radiation absorber is added to the nylon-12.

In an especially preferred embodiment of the method of the present invention a difference between a solution viscosity of the melted and sintered polymer and a solution viscosity of the polymer powder is less than 10%, the solution viscosity measured according to ISO 307.

The present invention further provides an apparatus for the layer-by-layer production of a three dimensional object according to the above embodiments and according to this embodiment, the apparatus comprises at least the following components:

a construction chamber;
a vertically moveable construction platform in a lower surface of the construction chamber;
a powder applicator;
a laser;
a laser beam shaping apparatus; and
a laser beam scanner;

wherein the components are arranged such that the laser beam is directed to the surface of the construction platform, and at the construction platform the focus maximum power density of the laser beam is less than 50% greater than the average power density of the laser beam.

In a highly preferred embodiment, the laser beam shaping apparatus comprises at least one of a refractive beam shaper and a beam homogenizer.

It may be preferable that the beam-shaping system adjusts the maximum power density value at the focus to less than 50% above the average power density valve at the focus, preferably less than 20% and particularly preferably less than 10%.

Surprisingly, it has been found that when the power density distribution is designed in such a way that the maximum power density value at the focus of the laser exceeds the power density value across the entire focus by not more than 50%, molecular weight degradation may be avoided. This requirement is specifically not met by the almost Gaussian power density distribution which is conventional for laser beams (where the amplitude of the electromagnetic field decreases exponentially with the distance from the propagation axis), and therefore, molecular weight degradation is observed. A particular advantage of the apparatus according to the invention may be achieved simply through the presence of a beam-shaping system, without any need for major reengineering of the coating systems.

In principle, any beam-shaping system known to the person skilled in the art may be suitable in the apparatus according to the present invention. In preferred embodiments a refractive beam shaper and/or homogenizer may be utilized.

FIG. 1 shows one embodiment of the apparatus according to the present invention, where the apparatus for the layer-by-layer production of an object comprises a construction vessel (9). Within the construction vessel, a plinth (7) has been arranged, and has an upper side which may be in essence level and in essence orientated parallel to the upper edge of the construction vessel. The plinth (7) has been designed to bear an object (6) to be formed. The plinth (7) may be moved vertically by a height-adjustment device (not shown). The plane within which the powder material is applied and solidified forms an operating plane (5). The laser beam (2) from a laser (1) may be shaped by a suitable apparatus (3) before it is deflected onto a powder surface (5) by a scanner system (4).

The construction vessel may have temperature control and/or may be inertized by using inert gas, for example by using argon.

The present invention further provides processes for the layer-by-layer production of three-dimensional objects made of polymer powders, where the selective melting and, respectively, sintering of the polymer powder is achieved by a laser, and the maximum power density value thereof at the focus is less than 50% above the average power density value at the focus. It may be preferable that the maximum power density value at the focus is less than 20% above the average power density at the focus, particularly preferably less than 10%.

In the process according to the invention, the power density distribution at the focus is in particular may be adjusted by beam shaping, preferably in apparatuses as described above, and it is particularly preferable that the beam shaping is achieved by means of a refractive beam shaper and/or homogenizer.

In principle, any of the polymer powders known to the person skilled in the art may be suitable for use in the apparatus according to the invention or in the process according to the invention. In particular, thermoplastic and thermoelastic materials may be suitable, for example polyethylene (PE, HDPE, LDPE), polypropylene (PP), polyamides, polyesters, polyester esters, polyether esters, polyphenylene ethers, polyacetals, polyalkylene terephthalates, in particular polyethylene terephthalate (PET) and polybutylene terephthalate (PBT), polymethyl methacrylate (PMMA), polyvinyl acetal, polyvinyl chloride (PVC), polyphenylene oxide (PPO), polyoxymethylene (POM), polystyrene (PS), acrylonitrile-butadiene-styrene (ABS), polycarbonates (PC), polyether sulphones, thermoplastic polyurethanes (TPU), polyaryl ether ketones, in particular polyether ether ketone (PEEK), polyether ketone ketone (PEKK), polyether ketone (PEK), polyether ether ketone ketone (PEEKK), polyaryl ether ether ether ketone (PEEEK) or polyether ketone ether ketone ketone (PEKEKK), polyetherimides (PEI), polyarylene sulphides, in particular polyphenylene sulphide (PPS), thermoplastic polyimides (PI), polyamidimides (PAI), polyvinylidene fluorides, and also copolymers of the said thermoplastics, e.g. a polyaryl ether ketone (PAEK) /polyaryl ether sulphone (PAES) copolymer, mixtures and/or polymer blends. The polymer powder particularly preferably comprises at least one polyamide, in particular nylon-12.

In a general method of operation, data concerning the shape of the object (6) to be produced may be first generated or stored in a computer on the basis of a design program conventionally known to one of ordinary skill in this technology. The processing of the data for producing the object involves dissecting the object into a large number of horizontal layers which are thin in comparison with the size of the object, and providing the geometric data, for example, in the form of data sets, e.g. CAD data, for each of the said large number of layers. This data for each layer may be generated and processed prior to production or simultaneously with production of each layer.

The construction platform (7) is then first moved by means of the height-adjustment apparatus to the highest position, in which the surface of the construction platform (7) is in the same plane as the surface of the construction chamber, and it is then lowered by an amount corresponding to the intended thickness of the first layer of material, in such a way as to form, within the resultant recess, a depressed region delimited laterally by the walls of the recess and underneath by the surface of the construction platform (7). A first layer of the material to be solidified, with the intended layer thickness, is then introduced, for example by an applicator (8) into the cavity formed by the recess and by the construction platform (7), or into the depressed region, and a heating system may optionally be used to heat the sample to a suitable operating temperature, for example from 100° C. to 360° C., preferably from 120° C. to 200° C., particularly preferably from 140° C. to 160° C. These ranges include all values and subranges therebetween. The control unit (4) then controls the deflection device in such a way that the deflected light beam (2) successively encounters all of the positions within the layer and sinters or melts the material there. A firm initial basal layer may thus be formed. In a second step, the construction platform (7) is lowered by the height-adjustment apparatus by an amount corresponding to one layer thickness, and a second layer of material is introduced by means of the applicator (8) into the resultant depressed region within the recess, and the heating system may in turn optionally be used to heat that layer.

In one embodiment, the deflector device may be controlled by the control unit (4) in such a way that the deflected light beam (2) encounters only that region of the layer of material that is adjacent to the internal surface of the recess, and solidifies the layer of material there by sintering, thus producing a first annular wall layer with a wall thickness of about 2 to 10 mm which completely surrounds the remaining pulverulent material of the layer. This portion of the control system may therefore provide a device for producing, simultaneously with formation of the object in each layer, a container wall surrounding the object (6) to be formed.

After lowering the construction platform (7) by an amount corresponding to the layer thickness of the next layer, applying the material and heating as described above, the production of the object (6) itself may be started. In this operation, the control unit (4) controls the deflector device in such a way that the deflected light beam (2) encounters those positions of the layer which are to be solidified in accordance with the coordinates stored in the control unit for the object (6) to be produced. The procedure for the remaining layers is analogous. In cases where it is desirable to produce an annular wall region in the form of a vessel wall which encloses the object together with the remaining, unsintered material, and thus prevents escape of the material when the construction platform (7) is lowered below the base of the construction chamber, the device sinters an annular wall layer onto the annular wall layer thereunder, for each layer of the object. Production of the wall may be omitted if a replaceable vessel corresponding to EP 1037739, or a fixedly incorporated vessel, is used.

After cooling, the resultant object may be removed from the apparatus.

Any desired mouldings may be produced in a simple manner by using the apparatus and method according to the present invention.

The present invention also provides mouldings produced from polymer powder by using an apparatus according to the invention or by using a process according to the invention. It may be particularly preferable that the solution viscosity in accordance with ISO 307 of the mouldings produced according to the invention is not more than 10% smaller than that of the polymer powder used (Schott AVS Pro, solvent acidic m-cresol, volumetric method, two measurements, dissolution temperature 100° C., dissolution time 2 h, polymer concentration 5 g/l, measurement temperature 25° C.).

Having generally described this invention, a further understanding can be obtained by reference to certain specific examples which are provided herein for purposes of illustration only, and are not intended to be limiting unless otherwise specified. It is assumed that even in the absence of further details it is possible for a person skilled in the art to utilise the above description to the widest possible extent. Alternative embodiments of the present invention may be obtained analogously.

EXAMPLES

For the purposes of the present invention, the measurement methods mentioned in Table 1 are used, and as far as technically possible these are used not only to determine the properties of the materials used but also for those of the resultant products.

TABLE 1

| | Value | Unit | Test/Test equipment/test parameters |
|---|---|---|---|
| Bulk density | 0.445 | g/cm$^3$ | DIN 53466 |
| $d_{50}$ grain size | 55 | μm | Malvern Mastersizer 2000, dry measurement, 20-40 g of powder metered into system by means of Scirocco dry-dispersion equipment. Feed rate for vibrating trough 70%, dispersion air pressure 3 bar. Sample measurement time 5 seconds (5000 individual measurements), refractive index and blue-light value defined as 1.52. Evaluation by way of Mie theory |
| $d_{10}$ grain size | 37 | μm | Malvern Mastersizer 2000, parameters: see $d_{50}$ grain size |
| $d_{90}$ grain size | 78 | μm | Malvern Mastersizer 2000, parameters: see $d_{50}$ grain size |
| <10.48 μm | 4.0 | % | Malvern Mastersizer 2000, parameters: see $d_{50}$ grain size |
| Powder-flowability | 32 | s | DIN 53492 |
| Solution viscosity | 1.6 | — | ISO 307, Schott AVS Pro, solvent acidic m-cresol, volumetric method, two measurements, dissolution temperature 100° C., dissolution time 2 h, polymer concentration 5 g/l, measurement temperature 25° C. |
| BET (spec. surface area) | 6.4 | m$^2$/g | ISO 9277, Micromeritics TriStar 3000, nitrogen gas adsorption, discontinuous volumetric method, 7 measurement points at relative pressures P/P0 from about 0.05 to about 0.20, dead volume calibration by means of He (99.996%), sample preparation 1 h at 23° C. + 16 h at 80° C. in vacuo, spec. surface area based on devolatilized sample, evaluation by means of multipoint determination |
| Melting point, 1st heating procedure | 187 | ° C. | DIN 53765 DSC 7 from Perkin Elmer heating/cooling rate 20 K/min |
| Recrystallization temperature | 138 | ° C. | DIN 53765 DSC 7 from Perkin Elmer heating/cooling rate 20 K/min |
| Conditioning of material | | | Material is stored for 24 h at 23° C. and 50% humidity prior to processing. |

In all of the examples, a nylon-12 powder in accordance with DE19747309 is processed; it has the powder properties listed in Table 1 and is not post-condensable. Operations in all of the examples correspond to the description below and to FIG. 1. The construction chamber (9) is preheated to 155° C. for 180 minutes. The temperature in the construction chamber is then increased in such a way that the temperature at the powder surface is 168° C. Prior to the first irradiation, 40 layers are applied without irradiation. In the examples not according to the invention, the laser beam (2) from a laser (1) is directed by means of a scanner system (4) onto a powder surface (5) which has been temperature-controlled (168° C.) and inertized (argon). In the examples according to the invention, the laser beam (2) is first shaped by means of a suitable apparatus (3) before it is directed by means of a scanner system (4) onto a powder surface (5) which has been temperature-controlled (168° C.) and inertized (argon).

The component to be irradiated is positioned centrally within the construction area. A square area with edge length 50 mm is melted without contour irradiation. The construction platform (7) is then lowered by 0.15 mm, and a fresh powder layer is applied at a rate of 100 mm/s by means of a coater (8). The same steps are repeated until a three-dimensional component (6) of height 6 mm is produced. Once the irradiation has concluded, 40 more layers are also applied before the heating elements of the apparatus are switched off and the cooling phase initiated. The time required for each layer is below 40 s during the entire construction process.

After a cooling time of at least 12 hours, the component is removed and freed from the adhering powder. A sample is taken from the core in the centre of the component, for further testing. The solution viscosity of the said sample is determined in accordance with ISO 307 (test equipment: (Schott AVS Pro, solvent acidic m-cresol, volumetric method, two measurements, dissolution temperature 100° C., dissolution time 2 h, polymer concentration 5 g/l). The viscosity number thus determined provides a measure of the molecular mass of the polymer.

In all of the examples herein described, the power density distribution at the laser focus is measured using a FocusMonitor from PRIMES GmbH by a method based on ISO 13694. Laser power is measured by a method based on ISO 11554 by using an LM-1000 from Coherent Deutschland GmbH, and the average power is given here. The laser beam focus is measured in the centre of the construction area in accordance with ISO 11146 (2nd moment method). The design of the experimental apparatus is always such that the focal diameter at the level of the powder surface is 0.3 mm. The average power density value is determined by dividing the laser power by the area of the laser focus. The measurements are made in a laboratory at 23° C./50% humidity. Laser power control in the examples was achieved by means of a control device which operated by using PWM, and the power output of the laser therefore takes the form of pulses.

Example 1

Not According to the Invention

A ULR-50 from Universal Laser Systems Inc. served as laser ($CO_2$, wavelength 10.6 μm) with a Laser-Multi Controller LCT 3001 from MCA Micro Controller Applications and with a Synrad DC-5 power supply unit. A Scanlab power-SCAN 50 scanner is used in combination with varioSCAN 60. The pulse width modulation (PWM) switching frequency was 2 kHz and the duty factor is 40%. Laser energy input is 60 mJ/mm$^2$ (laser power 20.6 W, scan rate of laser beam 1144 mm/s, distance between irradiation lines 0.3 mm). Average power density measured across the entire focus is 29.1 kW/cm$^2$. The maximum power density value is 64.3 kW/cm$^2$. The solution viscosity determined on the component sample is 1.55 in accordance with ISO 307.

Example 2

Not According to the Invention

An OTF150-30-0.2 diode laser (wavelength 980 nm) from Optotools is used in combination with a Laser-Multi Controller LCT 3001 from MCA Micro Controller Applications, a DL 1600 power supply unit from Heim Electronic and a Raylase SS-20 scanner. The PWM is adjusted to switching frequency 2 kHz and duty factor 40%. In order to improve laser energy absorption, 0.1% of Printex alpha is admixed with the PA 12 powder. Laser energy input is 60 mJ/mm$^2$ (laser power 52.6 W, scan rate 2922 mm/s, distance between irradiation lines 0.3 mm). Power density measured across the entire focus is 74.4 kW/cm$^2$. The maximum power density value is 184.8 kW/cm$^2$. The solution viscosity determined on the component sample is 1.54 in accordance with ISO 307.

Example 3

Not According to the Invention

An IPG-ELR-100-1550 fibre laser (wavelength 1550) is used in combination with a Laser-Multi Controller LCT 3001 from MCA Micro Controller Applications, a DL 1600 power supply unit from Heim Electronic and a Raylase SS-10 scanner. The PWM is adjusted to switching frequency 2 kHz and duty factor 40%. In order to improve laser energy absorption, 0.1% of Printex alpha is admixed with the PA 12 powder. Laser energy input is 60 mJ/mm$^2$ (laser power 42.1 W, scan rate 2338 mm/s, distance between irradiation lines 0.3 mm). Power density measured across the entire focus is 59.6 kW/cm$^2$. The maximum power density value is 144.2 kW/cm$^2$. The solution viscosity determined on the component sample is 1.55 in accordance with ISO 307.

Example 4

According to the Invention

A ULR-50 from Universal Laser Systems Inc. serves as laser in combination with a Laser-Multi Controller LCT 3001 from MCA Micro Controller Applications (PWM switching frequency 2 kHz, duty factor 40%) and a Synrad DC-5 power supply unit. The laser beam is shaped by means of the piShaper 7_7_10.6 from MolTech GmbH. After the laser beam has been shaped it is in turn directed onto the powder surface by means of a Scanlab powerSCAN 50 scanner with varioSCAN 60. Laser energy input is 60 mJ/mm$^2$ (laser power 20.4 W, scan rate of laser beam 1133 mm/s, distance between irradiation lines 0.3 mm). Power density measured across the entire focus is 28.8 kW/cm$^2$. The maximum power density value was 30.5 kW/cm$^2$. The solution viscosity determined on the component sample is 1.58 in accordance with ISO 307.

Example 5

According to the Invention

An OTF150-30-0.2 diode laser (wavelength 980 nm) from Optotools is used in combination with a Laser-Multi Controller LCT 3001 from MCA Micro Controller Applications, a DL 1600 power supply unit from Heim Electronic. The PWM is adjusted to switching frequency 2 kHz and duty factor 40%.

The laser beam is shaped by means of the piShaper 6_6_TiS from MolTech GmbH and then directed onto the powder surface by means of a Raylase SS-20 scanner. In order to improve laser energy absorption, 0.1% of Printex alpha is admixed with the PA 12 powder. Laser energy input is 60 mJ/mm² (laser power 52.5 W, scan rate 2916 mm/s, distance between irradiation lines 0.3 mm). Power density measured across the entire focus is 74.3 kW/cm². The maximum power density value is 78.1 kW/cm². The solution viscosity determined on the component sample is 1.58 in accordance with ISO 307.

Example 6

According to the Invention

An IPG-ELR-100-1550 fibre laser (wavelength 1550) is used in combination with a Laser-Multi Controller LCT 3001 from MCA Micro Controller Applications, a DL 1600 power supply unit from Heim Electronic. The PWM is adjusted to switching frequency 2 kHz and duty factor 40%. The laser beam is shaped by means of the piShaper 6_6_1550 from MolTech GmbH and then directed onto the powder surface by means of a Raylase SS-10 scanner. In order to improve laser energy absorption, 0.1% of Printex alpha is admixed with the PA 12 powder. Laser energy input is 60 mJ/mm² (laser power 42.0 W, scan rate 2333 mm/s, distance between irradiation lines 0.3 mm). Power density measured across the entire focus is 59.4 kW/cm². The maximum power density value is 62.5 kW/cm². The solution viscosity determined on the component sample is 1.58 in accordance with ISO 307.

Example 7

According to the Invention

A ULR-50 from Universal Laser Systems Inc. serves as laser with a Laser-Multi Controller LCT 3001 (PWM switching frequency 2 kHz, duty factor 40%) from MCA Micro Controller Applications. The laser beam is shaped by means of the Beam Shaper TH-205-A-Y-A from Laser Components GmbH. After the laser beam is shaped it is in turn directed onto the powder surface by means of a Scanlab powerSCAN 50 scanner with varioSCAN 60. Laser energy input is 60 mJ/mm² (laser power 20.5 W, scan rate of laser beam 1138 mm/s, distance between irradiation lines 0.3 mm). Power density measured across the entire focus is 29.0 kW/cm². The maximum power density value is 30.5 kW/cm². The solution viscosity determined on the component sample is 1.59 in accordance with ISO 307.

Example 8

According to the Invention

A ULR-50 from Universal Laser Systems Inc. serves as laser with a Laser-Multi Controller LCT 3001 (PWM switching frequency 2 kHz, duty factor 40%) from MCA Micro Controller Applications. The laser beam is homogenized by means of the RD-202-A-Y-A (Laser Components GmbH) and is shaped by means of the Beam Shaper TH-205-A-Y-A from Laser Components GmbH. After the laser beam is shaped it is in turn directed onto the powder surface by means of a Scanlab powerSCAN 50 scanner with varioSCAN 60. Laser energy input is 60 mJ/mm² (laser power 20.3 W, scan rate of laser beam 1144 mm/s, distance between irradiation lines 0.3 mm). Power density measured across the entire focus is 28.7 kW/cm². The maximum power density value is 29.5 kW/cm². The solution viscosity determined on the component sample is 1.6 in accordance with ISO 307.

The beam shaping successfully achieves a marked increase in uniformity of power density distribution at the laser focus. The avoidance of power peaks eliminates or mitigates molecular weight degradation as measured by solution viscosity.

The invention claimed is:

1. A method for layer-by-layer production of a three dimensional object, comprising:
    applying a layer of a polymer powder having a thickness;
    selectively irradiating portions of the polymer powder layer with a laser beam having an average power density and a focus maximum power density to melt and sinter the irradiated polymer powder;
    cooling the melted and sintered powder to obtain a solid mass having a shape; and
    repeating the application, irradiating and cooling operations until the three dimensional object is obtained; and
    further comprising refractively shaping the laser beam prior to irradiation of the polymer powder,
    wherein before irradiation of the polymer powder, the laser beam is shaped such that the focus maximum power density is less than 50% greater than the average power density.

2. The method according to claim 1, further comprising heating the polymer powder layer prior to the laser irradiation.

3. The method according to claim 1, further comprising homogenizing the laser beam prior to irradiation of the polymer powder.

4. The method according to claim 1, wherein the focus maximum power density is less than 20% greater than the average power density.

5. The method according to claim 1, wherein the focus maximum power density is less than 10% greater than the average power density.

6. The method according to claim 1, wherein the polymer powder comprises a polymer selected from the group consisting of polyethylene (PE, HDPE, LDPE), polypropylene (PP), polyamides, polyesters, polyester esters, polyether esters, polyphenylene ethers, polyacetals, polyalkylene terephthalates, polymethyl methacrylate (PMMA), polyvinyl acetal, polyvinyl chloride (PVC), polyphenylene oxide (PPO), polyoxymethylene (POM), polystyrene (PS), acrylonitrile-butadiene-styrene (ABS), polycarbonates (PC), polyether sulphones, thermoplastic polyurethanes (TPU), polyaryl ether ketones, polyetherimides (PEI) and polyarylene sulphides.

7. The method according to claim 6, wherein the polymer powder comprises a polyamide.

8. The method according to claim 7, wherein the polyamide is nylon-12.

9. The method according to claim 8, further comprising adding a radiation absorber to the nylon-12.

10. The method according to claim 1, further comprising inertizing the polymer powder during the application, irradiating and cooling operations.

11. The method according to claim 10, wherein the inertizing comprises placing the polymer powder under argon.

12. The method according to claim 1, further comprising irradiation of the polymer powder to form a walls of a container about the three dimensional object.

13. The method according to claim 1, wherein
a difference between a solution viscosity of the melted and sintered polymer and a solution viscosity of the polymer powder is less than 10%, the solution viscosity measured according to ISO 307.

* * * * *